(No Model.)

W. G. THOMPSON.
SEWER GAS TRAP.

No. 330,529. Patented Nov. 17, 1885.

WITNESSES
M. E. Fowler
E. G. Siggers

INVENTOR
W. G. Thompson
by C. A. Snow & Co.
his Attorneys

UNITED STATES PATENT OFFICE.

WILLIAM G. THOMPSON, OF NEW YORK, N. Y.

SEWER-GAS TRAP.

SPECIFICATION forming part of Letters Patent No. 330,529, dated November 17, 1885.

Application filed March 31, 1885. Serial No. 160,772. (No model.)

*To all whom it may concern:*

Be it known that I, WILLIAM G. THOMPSON, a citizen of the United States, residing at New York, in the county of New York and State of New York, have invented a new and useful Improvement in Sewer-Gas Traps, of which the following is a specification, reference being had to the accompanying drawings.

My invention relates to a sewer-gas trap designed more particularly for use upon sinks; and it has for its object to provide a device of this character which will effectively prevent the entrance of sewer-gas into a room through the sink-pipe.

A further object of the invention is to provide said trap with a weighted valve, whereby, when the water in the sink has reached a certain point the valve will be removed from its seat, thus preventing the water from overflowing.

A further object of the invention is to provide a trap which may be used upon sinks now in use, and one that may be easily removed from the sink when the same is in use.

With these ends in view the invention consists in the combination, with a casing, of a rubber band or ring located at and projecting below the lower end thereof.

The invention further consists in the combination, with a casing adapted to be applied over the openings in a sink, of a weighted valve, and a rubber ring or band adapted to form a tight joint or seal.

Figure 1:
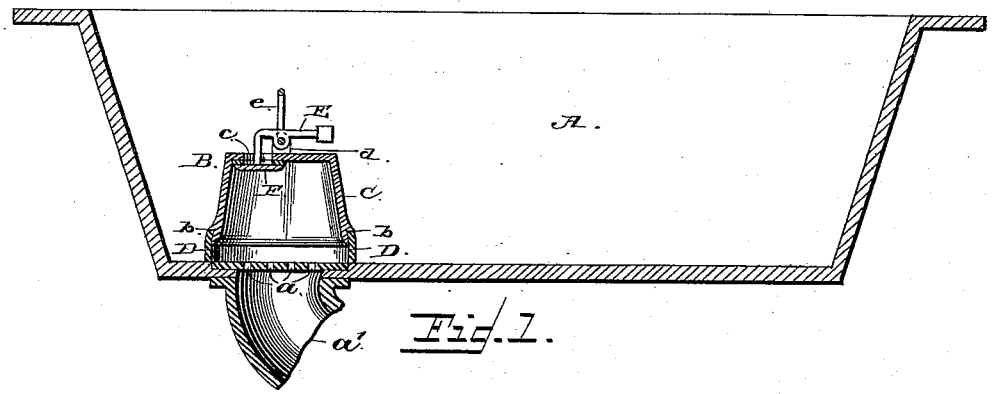
Figure 2:
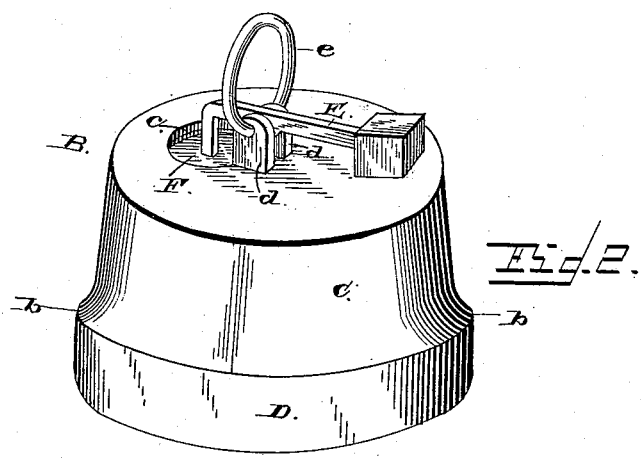
Figure 3:
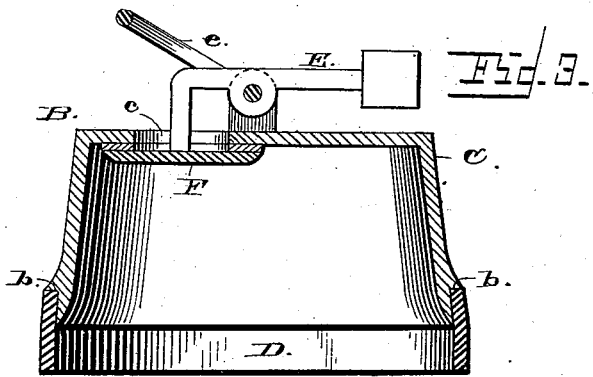

In the drawings, Figure 1 is a sectional elevation of a sink, showing my improved trap applied thereto. Fig. 2 is a perspective view of the trap detached. Fig. 3 is a longitudinal vertical section taken through the valve.

In the accompanying drawings, in which like letters of reference indicate corresponding parts in all the figures, A represents the sink, having the usual perforations or openings, $a$, and the escape-pipe $a'$.

B represents my improved trap, which is composed of a shell or casing, C, having flaring sides, and larger in diameter at its lower than at its upper end. Adjacent to the lower end of the shell or casing is a shoulder, $b$, and fitted on the lower end of the shell or casing is a rubber band or ring, D, which is flaring, and which bears against the shoulder $b$ at its upper end. The upper end of the shell or casing C is closed, and an opening, $c$, is formed in said closed end. Adjacent to the opening $c$, in the closed upper end of the shell or casing C, are provided upwardly-extending lugs $d$, having holes or openings.

E represents an arm, which is pivoted between the lugs $d$ by means of a ring, $e$, forming a finger-piece for raising the trap. The outer end of the arm E is weighted, while the inner end is turned downwardly, and formed integral with or secured to said downwardly-turned end of the arm E, is a valve, F, which is located within the shell or casing, and is adapted to close the opening $c$, on the under side thereof, said valve having a packing of rubber or other suitable material upon its upper face, so as to form a tight joint.

When the sink is not in use, the trap is placed over the perforations or openings in the same, the rubber ring or band forming a seal, and the valve being held to its seat by the weighted end of the arm. Should the water drip or run, when it has reached a point just above the upper end of the trap it will remove the valve from its seat and escape, thus preventing the water from overflowing.

When the sink is in use, the trap is raised by means of the finger-ring, and the water escapes through the perforations or openings in the sink into the outlet or escape pipe. It will be observed that the rubber band or ring supports the shell or casing, and that said ring will be held closely against the bottom of the sink by the weight of said casing, thus preventing the gas from escaping, while the valve is held tightly to its seat by the weighted end of the arm.

A great advantage of the trap shown is found in the fact that it can be applied to sinks in common use, may be manufactured and supplied as a separate article, needs no fitting, and can be manufactured at a slight cost.

Having fully described my invention, what I claim as new, and desire to secure by Letters Patent, is—

The combination, with the casing C, having the opening c and lugs located upon the upper side of the casing, of a weighted arm, E, pivoted between said lugs by a ring, e, and having a valve, F, located on its bent end within the casing.

In testimony that I claim the foregoing as my own I have hereto affixed my signature in presence of two witnesses.

WILLIAM G. THOMPSON.

Witnesses:
 JOHN B. SIMONSON,
 E. B. POTTS.